Figure 9:
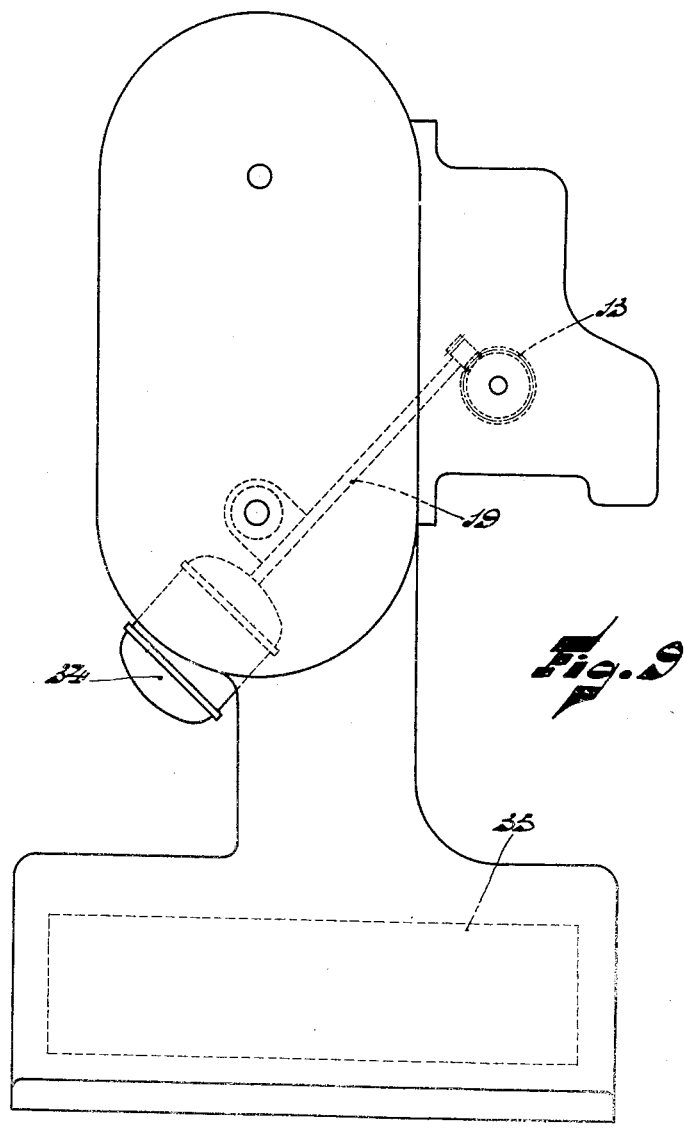

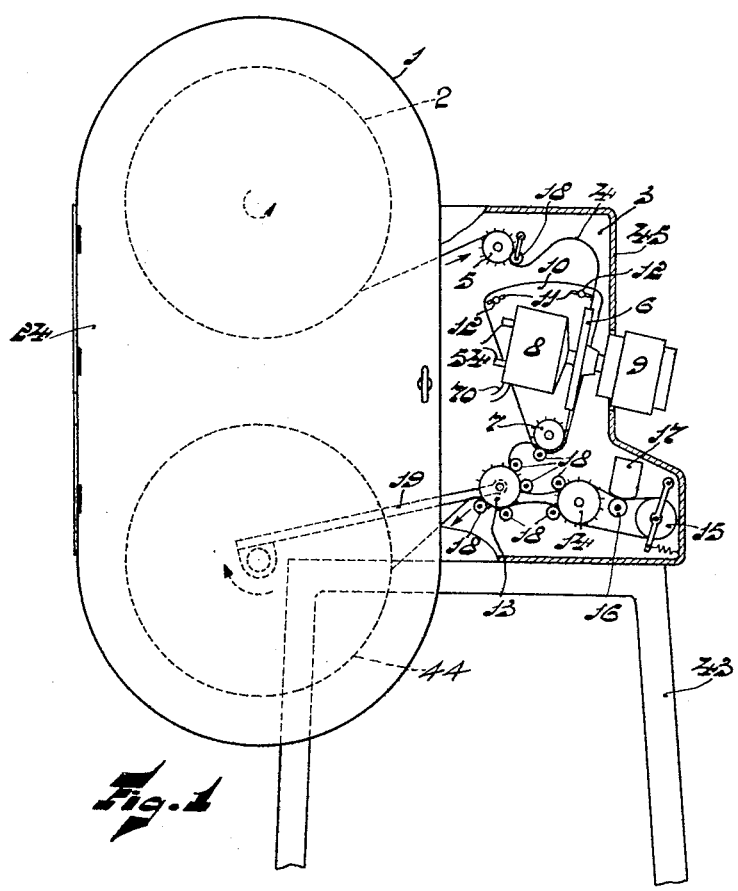

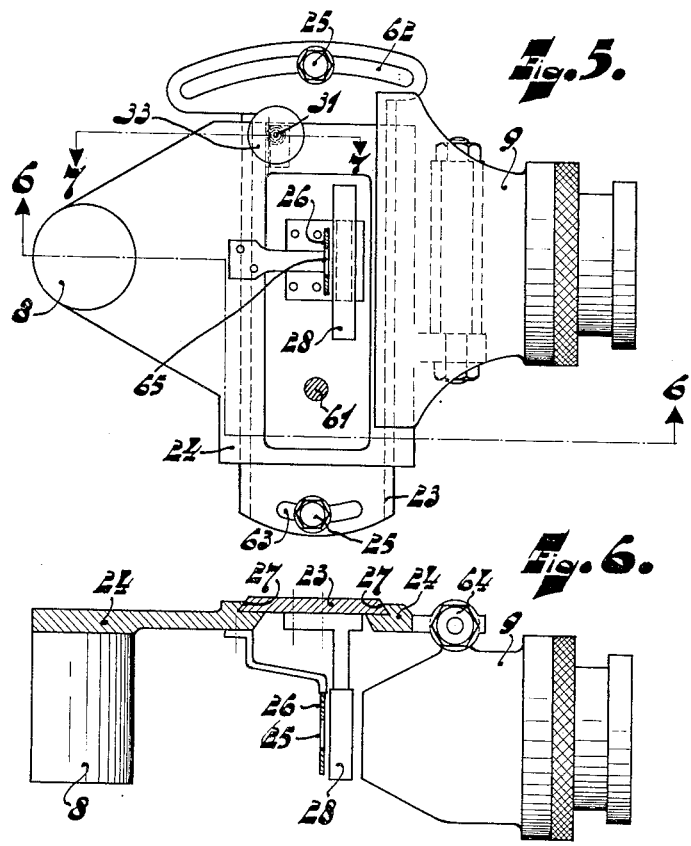
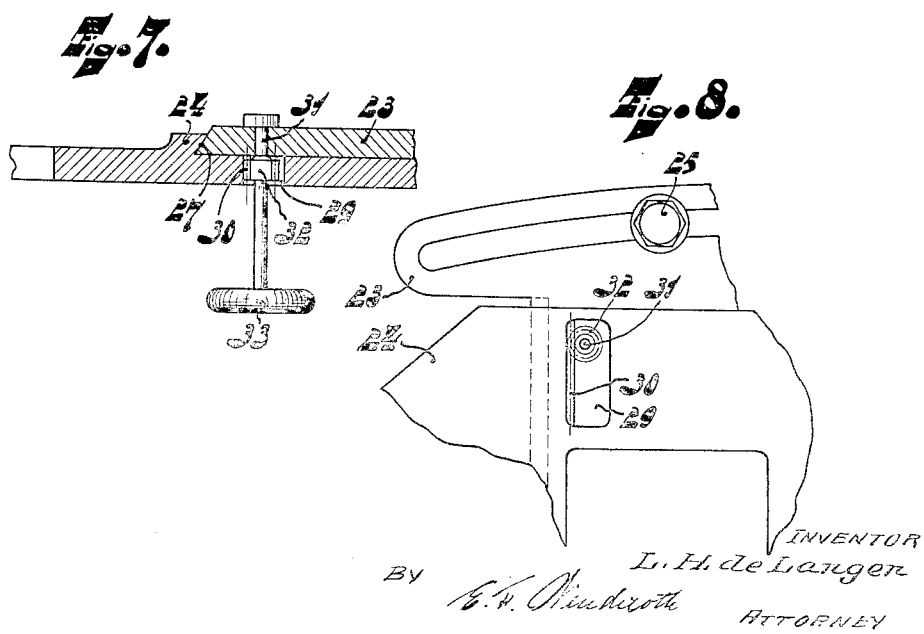

Sept. 5, 1939. L. H. DE LANGEN 2,171,722
MOTION PICTURE APPARATUS
Filed Nov. 10, 1936 3 Sheets-Sheet 3

INVENTOR
L. H. de Langen
BY
E. F. Wendroth
ATTORNEY

Patented Sept. 5, 1939

2,171,722

UNITED STATES PATENT OFFICE 2,171,722

MOTION PICTURE APPARATUS

Lambertus Hendrik de Langen, Eindhoven, Netherlands, assignor to N. V. Philips' Gloeilampenfabrieken, Eindhoven, Netherlands Application November 10, 1936, Serial No. 110,170
In Germany November 13, 1935

8 Claims. (Cl. 88—17)

My invention relates to motion picture apparatus, and more particularly to apparatus for projecting picture or sound-picture films having a width of at least 35 mm.

Present day projectors have numerous disadvantages, for example they are complicated in construction, expensive, and the housing for the usual arc lamp and arc regulating mechanism materially increases the overall size of the apparatus. Furthermore, it is necessary to align the lamp housing with the projection portion of the apparatus after the apparatus has been installed in a theatre, and if for any reason the apparatus becomes out of alignment, the realignment is difficult and time consuming. In addition, a large length of the film is exposed during its travel through the apparatus and thus might be damaged, for example scratched by dirt and dust; this condition is further aggravated by the fact that the arc lamps themselves produce dirt and ashes.

The main object of my invention is to provide a compact and inexpensive film projecting apparatus.

Another object is to provide means for readily positioning the projection of the aperture of the picture gate upon the screen, and for readily aligning the picture frames with the aperture of the picture gate.

Another object is to reduce the size of such apparatus by reducing the film travel in the apparatus.

A further object is to provide a construction in which the film is enclosed during its travel through the apparatus.

In accordance with my invention, I use as the projecting light source an artificially-cooled high-pressure metal-vapor lamp, and structually combine this lamp into a unitary structure with the projector device, including for example the conveying rollers, tightening rollers, picture gate, projector objective, etc.

Furthermore I preferably dispose the winding and unwinding reels at the rear of the projector in the space usually occupied by the arc lamp housing, and enclose these reels in a common housing thereby effecting a saving in space and cost over prior art projectors, particularly those in which the reels are mounted side by side.

Also, to permit an easy adjustment of the picture upon the screen, I mount at least the projecting light source, the picture gate and the picture objective upon a member rotatably about a horizontal axis. While the entire projection apparatus might be mounted in known manner upon a plate rotatably about a horizontal axis, the above construction is to be much preferred as it is considerably simpler, and due to its smaller mass and overall dimensions can be rotated through a larger angle, which is an important advantage in view of the different conditions existing in various theatres.

When using my invention in intermittently-driven film apparatus, I prefer to mount the rotatable member about the axis of the Maltese cross roller or similar driving roller. In such apparatus, the exact position of the film in the film gate depends not only upon the intermittent motion produced by this roller but also upon whether or not the film portion between the roller and the film gate is drawn out, and it is always advantageous to mount the Maltese cross roller as close as possible to the film gate to reduce the length of this film portion. By rotably mounting the movable member about the axis of this roller, the above conditions are met without requiring displacement of the roller when making optical adjustments; which displacement would be necessary if the member were rotated about an axis further remote from the guide and the roller were mounted upon the member but outside the axis of rotation thereof. If it is unfeasible to mount the Maltese roller upon the movable member, I rotate the member about any desired axis and provide guiding means on the member to insure the film leaving the guide of the picture gate in a longitudinal direction, thereby preventing damage to the film.

The construction of the invention has many advantages. For example, the reproducing apparatus, including the lamp, forms a constructional unit which may be assembled from only a few component parts finished in themselves, and which may be enclosed in a common housing. Furthermore, the light source and its housing can be located within the projector device without appreciably increasing the external dimensions of the apparatus, and as the large and extending arc lamp housings are eliminated, no adjustment of the housings with respect to the projecting device is required when installing the apparatus. Furthermore, the path of film is considerably reduced which in turn decreases the cost and size of the apparatus. Further advantages will appear as the description progresses.

I am aware that it has been proposed to construct home projectors with a stationary portion and a movable portion, however in such cases both the screen and projector can be freely moved with respect to each other, and the apparatus is made adjustable in a horizontal plane to allow its use in different places with different space conditions. In the larger apparatus for projecting films of 35 mm. or larger width, with which the present invention is particularly concerned, the apparatus and screen are fixed with respect to each other, and the pictures are only adjusted vertically and, as a rule, the apparatus is adapted to be inclined with respect to the screen.

In order that my invention may be clearly understood and readily carried into effect I shall describe same more fully with reference to the accompanying drawings in which:

Figure 1 is a partly sectionized side-view of a sound-picture apparatus according to the invention, Fig. 2 is a sectional view of the lamp housing showing the light source, Fig. 3 is a side view of a modification of the adjustment mechanism shown in Fig. 1, Fig. 4 is a side view of another embodiment of the adjustment mechanism shown in Fig. 1, Fig. 5 is a detailed side-view of another embodiment of the adjusting mechanism, Fig. 6 is a sectionized view taken along line 6—6 of Fig. 5, Fig. 7 is an enlarged view taken along line 7—7 of Fig. 5, Fig. 8 is an enlarged view of a portion of Fig. 5, and Fig. 9 is an outline view of an apparatus according to the invention.

The sound-picture apparatus shown in Fig. 1 comprises a suitable pedestal 43 upon which are mounted a reel housing 1 provided with a single door 24 and containing an unwinding reel 2 and a winding reel 44. Also mounted upon the pedestal 43 is the projector device comprising a housing 45, a vertical plate 3 carrying the film-feeding mechanism, the sound-reproducing mechanism and the picture reproducing mechanism; all of which are enclosed within the housing.

The portion of the film-driving mechanism visible in Fig. 1 comprises three conveying sprocket rollers 5, 13 and 14, and a Maltese cross roller 7 driven in known manner. As the means for driving such rollers is well known in the art, further detailed description and illustration of same is believed unnecessary.

A sound-picture film 4 leaves the unwinding reel 2 and passes in the direction of the arrow over roller 5, past a picture gate 6 (later to be referred to), over rollers 13 and 14, over the slightly curved case of the light source 17, i. e. between the light source 17 and photo-cell 16, around a uniformly spring-biased tensioning roller 15, and over rollers 14 and 13 to the winding reel 44 driven by a shaft 19. To properly guide the film, as well as to press same against the rollers 5, 7, 13 and 14 and to tighten same, a plurality of rollers 18 are mounted upon the plate 3 at the proper points.

The term "picture gate" as used herein and in the claims is to be understood to include not only the film guide and door having an aperture for defining the film picture, but also an aperture plate, which palte is mounted separately from the guide.

The picture-projecting mechanism is carried by a triangular-shaped plate 10 pivotally-mounted upon the plate 3 so as to be rotatable about a horizontal axis and provided with two circular-shaped slots 11 through which extend clamping screws 12 secured to plate 3. This mechanism comprises a lamp casing 8 fixedly mounted on plate 10, a picture gate 6, and a picture objective 9.

As shown in Fig. 2 the lamp housing 8 contains an artificially-cooled high-pressure metal vapor discharge tube 50 having an envelope 51 of vitreous material and forming a contracting discharge path. The envelope contains a small amount of mercury and the mercury vapor filling during operation has a pressure of more than 6 atmospheres and preferably about 100 atmospheres. The tube preferably has a gaseous filling to facilitate ignition and has two incandescible electrodes 52 protruding slightly from the mercury and connected through conductors 70 to a supply source (not shown).

The tube is enclosed in a housing 53 provided with inlet and outlet tubes 54 whereby it can be cooled by water circulated from the ordinary water supply, or by compressed air or other substances of low light absorbing capacity.

Such tubes, which are described in the co-pending United States patent application Ser. No. 46,952 to Bol et al., filed October 26, 1935, now Patent No. 2,094,694, are particularly advantageous for use in film projectors. More particularly they have an intrinsic brilliancy greatly exceeding a minimum value of 4000 international candles per sq. cm. and extending to 100,000 international candles per sq. cm. or more, and the spectrum of the light produced satisfies the conditions occurring in projector work. Furthermore they do not require regulating mechanisms such as carbon feeding devices, and do not produce during their operation dirt or dust which might damage the film or dirty the machine. The tubes are preferably so mounted in the apparatus that they may be placed in proper position in a suitable holder by the manufacturers and the replacement of the tubes can be effected without adjusting the apparatus.

It will be noted that the film at all times travels within a closed housing, and is not subjected to dirt, scratches or other deteriorations, and as the discharge tubes do not produce dirt or ashes there is no difficulty on this account.

In the apparatus illustrated in Fig. 1 the plate 10 is pivoted on the horizontal axis of the roller 7 in which case upon rotation of plate 10 to adjust the position of the picture upon the screen, the length of film between the picture gate 6 and roller 7 will not be changed, i. e., the film will not be drawn out and the picture frames improperly positioned with respect to the picture gate. Furthermore, the film will leave the guide of the picture gate 6 in a straight line regardless of the position of plate 10, whereby the film will not be damaged by the edge of the guide.

As shown in Fig. 3, the plate 60 is similar to plate 10 except that it is provided with only one holding screw 20, and is provided upon its upper edge with a rack 21 engaging a spur gear 22 mounted on a shaft extending outside the housing 45. By means of handle or slotted knob on the end of this shaft the plate 60 can be moved from a point outside the housing 45 to position the picture upon the screen.

Figure 4 illustrates another embodiment of the adjusting mechanism in which plate 10 is pivoted at a point B lying outside the axis of the roller 7. In this case, there will be a displacement of the film with respect to the guide 6 which may be adjusted by means of any of the adjusting devices well known in the art. A roller A secured to plate 10 ensures that the film always leaves the picture gate at the proper angle and thus prevents undue wearing of the film by the edge of the gate. If desired a guide roller may also be arranged on plate 10 at the entrance to gate 6. The construction illustrated in the Figure, however, is not as advantageous as that shown in Fig. 1 because the film will be drawn out to some extent when plate 10 is rotated and means must be provided to compensate for this.

A preferred embodiment of the adjusting mechanism is shown in Figs. 5 to 8, which mechanism affords both a simple means for adjusting the projection of the picture-gate aperture upon the screen as well as adjustment of the picture frames with respect to the picture-gate aperture. As shown in these figures the adjusting mechanism comprises a plate 23 pivoted on the axis of the Maltese cross roller 7 as indicated at 61, and provided with two circular-shaped slots 62 and 63 through which extend fastening screws 25 cooperating with threaded holes in the plate 3 (see Fig. 1). Secured to the plate 23 is a film guide 28 and as this guide is stationary with respect to the axis 61 and hence to the Maltese roller 7 the film is prevented from being drawn out upon movement of plate 23. The plate 23 may be rotated from a point outside the housing by means of a mechanism such as shown in Figure 3.

Mounted on plate 23 so as to be slidable vertically is an apertured plate 24 carrying the lamp housing 8, and an aperture plate 26 provided with a rectangular-shaped picture aperture 65 corresponding to the picture frames of the film. Secured to the plate 24 by a bolt 64 so as to be adjustable in a horizontal plane is the objective 9.

An adjustment wheel 33 (see Fig. 7) located outside the housing 45 serves to move plate 24 with respect to the plate 23 and thus to adjust the film with respect to the aperture 65. As shown more clearly in Figs. 7 and 8, plate 24 is provided with a rectangular aperture 29 having on one edge a rack 30 cooperating with a spur gear 32 mounted on a shaft 31 rotatably mounted on plate 23 and carrying the wheel 33. In the construction illustrated in Figs. 5 to 8, the picture aperture of film guide 28 must of course be larger than the aperture 65 in scren 26.

Figure 9 is an outline drawing of the projector according to the invention and illustrates the compactness and accessibility of the apparatus. In this figure, numeral 34 represents a driving motor, for instance a synchronous motor, which drives the winding reel 44 and the roller 13 through the shaft 19. The pedestal is provided with a compartment 35 in which may be housed the sound amplifying equipment as well as similar apparatus.

It will be noted that in the above apparatus no shutter device has been shown, this being eliminated by operating the discharge tube on alternating or pulsating direct current having a frequency corresponding to the picture frequency, as has been described in the copending United States patent application Ser. No. 11,370 to Van Alphen et al., filed March 15, 1935. Due to the elimination of the shutter as well as to other features of the present invention the apparatus is materially reduced in size and cost.

While I have described my invention in connection with specific constructions and applications, I do not wish to be limited thereto, but desire the appended claims to be construed as broadly as permissible in view of the prior art.

What I claim is:

1. An apparatus for reproducing films comprising, a projecting device of unitary construction comprising a horizontal pivot, a member rotatably mounted upon said pivot, a second member slidably mounted on said first member and movable with respect thereto in a direction perpendicular to the axis of the pivot, an artificially-cooled high-pressure metal-vapor discharge tube, optical means including a picture objective, and a picture gate, said discharge tube, picture objective and picture gate being fixedly mounted on said second member in optical alignment, and means for moving the film including a film-winding reel and a film-unwinding reel, said reels being stationarily mounted with respect to said first member at a point usually occupied by a lamp housing.

2. In an apparatus for projecting films, a stationary horizontal pivot, a support mounted on said pivot and rotatable in a vertical plane to adjust the picture on a screen, a member movably mounted on said support to allow framing of the picture, a light source, optical means including a picture objective, and a picture gate, said light source, objective and picture gate being fixedly mounted on said member in optical alignment.

3. An apparatus for reproducing films comprising, a projecting device of unitary construction comprising a member rotatably mounted on a horizontal axis to allow adjustment of the pictures on a screen, means to guide the film fixedly mounted on said member, a plate movably mounted on said member, an artificially-cooled high-pressure metal-vapor discharge tube fixedly mounted on said plate, optical means including a picture objective fixedly mounted on said plate, and a picture gate fixedly mounted on said plate, said plate being movable with respect to said member to frame the picture in said picture gate, means for moving the film including a film-winding reel and a film-unwinding reel, said reels being stationarily mounted with respect to said member at a point usually occupied by a lamp housing.

4. An apparatus for reproducing films comprising, a projecting device of unitary construction comprising a member rotatable about a horizontal axis to position the picture on a screen, film-guiding means fixedly mounted on said member, a plate movably-mounted on said member, means to move said plate with respect to said member to frame the picture, optical means including a picture objective fixedly mounted on said plate, a picture gate fixedly mounted on said plate, and an artificially-cooled high-pressure metal-vapor discharge tube fixedly-mounted on said plate, and means for moving the film including a film-winding reel and a film-unwinding reel, said reels being stationarily mounted with respect to said rotatable member at a point usually occupied by a lamp housing.

5. An apparatus for reproducing films comprising a support, a projecting device of unitary construction including a horizontal pivot mounted on said support, a member rotatably mounted on said pivot to position the picture on a screen, a plate slidably mounted on said member and movable with respect thereto in a direction perpendicular to the axis of the pivot to frame the picture, an artificially-cooled high-pressure metal-vapor discharge tube, optical means including a picture objective, and a picture gate, said discharge tube optical means and picture gate being fixedly mounted on said plate in optical alignment, and means for moving the film comprising a film-driving roller arranged coaxially with said pivot, a film-winding reel, and a film-unwinding reel, said reels being stationarily mounted with respect to said rotatable member at a point usually occupied by a lamp housing.

6. An apparatus for reproducing films comprising, a projecting device of unitary construction comprising a rotatably-mounted member, a film guide fixedly mounted on said member, a plate movably-mounted on said member, optical means including a picture objective fixedly mounted on said plate, an artificially-cooled high-pressure metal-vapor discharge tube fixedly mounted on said plate, a picture gate fixedly mounted on said plate, means for moving the film including a film-winding reel and a film-unwinding reel, said reels being stationarily mounted with respect to said movable member at a point usually occupied by a lamp housing, a housing enclosing said projecting device, and means controlled from a point outside said housing for rotating said member to adjust the picture on the screen and for moving said plate with respect to said member to frame the picture in the picture gate.

7. An apparatus for reproducing films comprising, a pedestal, a housing mounted on said pedestal, a projecting device within said housing and comprising as a unitary structure a horizontal pivot, a member rotatably mounted on said pivot to adjust the picture on a screen, a plate slidably mounted on said member and movable with respect thereto in a direction perpendicular to the axis of the pivot to frame the picture, an artificially-cooled high-pressure metal-vapor discharge tube mounted on said plate, optical means including a picture objective mounted on said plate and a picture gate mounted on said plate, means for moving the film including a film-driving roller disposed at the axis of said pivot, a film-winding reel, and a film-unwinding reel, said reels being arranged one above the other in the space usually occupied by the lamp housing and having fixed axes, and a second housing enclosing both of said reels.

8. In an apparatus for projecting films, a stationary support, a member pivotally mounted on said support on a horizontal axis to allow adjustment of the picture on a screen, a second member slidably mounted upon said first member and movable with respect thereto in a direction perpendicular to the horizontal axis to allow framing the picture, a light source, optical means including a picture objective, and a picture gate, said light source, objective and picture gate being mounted in optical alignment on said second member.

LAMBERTUS HENDRIK DE LANGEN.